United States Patent
Li et al.

(10) Patent No.: US 11,799,179 B2
(45) Date of Patent: Oct. 24, 2023

(54) LIQUID CRYSTAL PHASE SHIFTER, METHOD FOR OPERATING THE SAME, LIQUID CRYSTAL ANTENNA, AND COMMUNICATION APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Liang Li, Beijing (CN); Tienlun Ting, Beijing (CN); Jie Wu, Beijing (CN); Xue Cao, Beijing (CN); Ying Wang, Beijing (CN); Haocheng Jia, Beijing (CN); Cuiwei Tang, Beijing (CN); Peizhi Cai, Beijing (CN); Chuncheng Che, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/401,693

(22) Filed: Aug. 13, 2021

(65) Prior Publication Data

US 2021/0376434 A1    Dec. 2, 2021

Related U.S. Application Data

(63) Continuation-in-part of application No. 16/642,570, filed as application No. PCT/CN2019/100041 on Aug. 9, 2019, now Pat. No. 11,119,364.

(30) Foreign Application Priority Data

Aug. 10, 2018  (CN) .......................... 201810911837.X

(51) Int. Cl.
*H01P 1/18* (2006.01)
*G02F 1/1343* (2006.01)
*G02F 1/13* (2006.01)

(52) U.S. Cl.
CPC ............ *H01P 1/184* (2013.01); *G02F 1/1313* (2013.01); *G02F 1/134309* (2013.01)

(58) Field of Classification Search
CPC ......... G02F 1/134309; G02F 1/134318; G02F 1/1313; H01P 1/184
See application file for complete search history.

(56) References Cited

U.S. PATENT DOCUMENTS

| 2008/0068548 A1* | 3/2008 | Kwon ............... G02F 1/134336 349/139 |
| 2008/0074600 A1* | 3/2008 | Hsu ................... G02F 1/133707 349/143 |

(Continued)

FOREIGN PATENT DOCUMENTS

| CN | 106025452 A | 10/2016 |
| CN | 106154603 A | 11/2016 |

(Continued)

OTHER PUBLICATIONS

Extended European Search Report dated Mar. 21, 2022 corresponding to application No. 19848404.0-1205.

(Continued)

*Primary Examiner* — Nathanael R Briggs
(74) *Attorney, Agent, or Firm* — Nath, Goldberg & Meyer; Joshua B. Goldberg

(57) ABSTRACT

There is provided a liquid crystal phase shifter including first and second substrates opposite to each other, and a liquid crystal layer between the first and second substrates. The first substrate includes a first base plate and a first electrode layer at a side of the first base plate proximal to the liquid crystal layer. The second substrate includes a second base (Continued)

plate and a second electrode layer at a side of the second base plate proximal to the liquid crystal layer. The first electrode layer includes a main body structure having a first side and a second side opposite to each other with respect to an extension direction of the main body structure, and a plurality of branch structures connected to at least one of the first side and the second side of the main body structure. The second electrode layer includes a plurality of first fingers.

20 Claims, 7 Drawing Sheets

(56) References Cited

U.S. PATENT DOCUMENTS

| | | |
|---|---|---|
| 2012/0274419 A1 | 11/2012 | Lee et al. |
| 2014/0022029 A1* | 1/2014 | Glushchenko ............ H01P 1/18 977/773 |
| 2016/0139421 A1* | 5/2016 | Guo ....................... G02B 30/31 349/138 |
| 2016/0164155 A1 | 6/2016 | Wang et al. |
| 2019/0140363 A1* | 5/2019 | Otsubo .................. H01Q 21/00 |

FOREIGN PATENT DOCUMENTS

| | | |
|---|---|---|
| CN | 107394318 A | 11/2017 |
| CN | 107994302 A | 5/2018 |
| CN | 108181745 A | 6/2018 |
| CN | 208384288 U | 1/2019 |
| EP | 3609017 A1 | 2/2020 |

OTHER PUBLICATIONS

Karabey, et al. "Tunable loaded line phase shifters for microwave applications"; IEEE; 2011.

Indian First Office Action dated Jun. 16, 2021 corresponding to application No. 202027021827.

International Search Report dated Oct. 30, 2019 corresponding to application No. PCT/CN2019/100041.

Karabey, et al. "Tunable Loaded Line Phase Shifters for Microwave Applications"; Institute of Microwave Engineering and Photonics; Jan. 5, 2011.

Notification of Reasons for Refusal dated Aug. 30, 2023 corresponding to Japanese Patent Application No. 2020-528391.

* cited by examiner

LIQUID CRYSTAL PHASE SHIFTER, METHOD FOR OPERATING THE SAME, LIQUID CRYSTAL ANTENNA, AND COMMUNICATION APPARATUS

CROSS REFERENCE TO RELATED APPLICATIONS

This is a Continuation-In-Part of U.S. patent application Ser. No. 16/642,570, filed Feb. 27, 2020, a National Phase Application filed under 35 U.S.C. 371 as a national stage of PCT/CN2019/100041, filed Aug. 9, 2019, an application claiming the benefit of Chinese Application No. 201810911837.X, filed Aug. 10, 2018, the content of each of which is hereby incorporated by reference in its entirety.

TECHNICAL FIELD

The present disclosure relates to the field of communication technologies, and in particular, to a liquid crystal phase shifter, a liquid crystal antenna, a communication apparatus, and a method for operating a liquid crystal phase shifter.

BACKGROUND

A phase shifter is a device capable of adjusting a phase of a microwave, is widely applied to electronic communication systems, and is a core component in systems such as phased array radars, synthetic aperture radars, radar electronic countermeasure systems, satellite communication systems, transceivers, and the like. High performance phase shifters therefore will play a crucial role in these systems.

SUMMARY

Embodiments of the present disclosure provide a liquid crystal phase shifter, a liquid crystal antenna, a communication apparatus, and a method for operating a liquid crystal phase shifter.

A first aspect of the present disclosure provides a liquid crystal phase shifter, including
a first substrate and a second substrate opposite to each other, and a liquid crystal layer between the first substrate and the second substrate; wherein
the first substrate includes a first base plate and a first electrode layer at a side of the first base plate proximal to the liquid crystal layer;
the second substrate includes a second base plate and a second electrode layer at a side of the second base plate proximal to the liquid crystal layer; and
the first electrode layer includes a main body structure having a first side and a second side opposite to each other with respect to an extension direction of the main body structure, and a plurality of branch structures connected to at least one of the first side and the second side of the main body structure,
wherein the second electrode layer includes a plurality of first fingers in one-to-one correspondence with the plurality of branch structures, and an orthographic projection of each first finger on the first base plate at least partially overlaps an orthographic projection of a corresponding branch structure on the first base plate but does not overlap the main body structure.

In an embodiment, each of the first side and the second side of the main body structure is connected with the plurality of branch structures.

In an embodiment, the plurality of branch structures connected to the first side and the plurality of branch structures connected to the second side are symmetric about the main body structure.

In an embodiment, the second electrode layer includes a first conductive structure and a second conductive structure;
an orthographic projection of the first conductive structure on the first base plate partially overlaps an orthographic projection of at least one of the plurality of branch structures connected to the first side of the main body structure on the first base plate; and
an orthographic projection of the second conductive structure on the first base plate partially overlaps an orthographic projection of at least one of the plurality of branch structures connected to the second side of the main body structure on the first base plate.

In an embodiment, the first electrode layer is a microstrip, and a ground electrode is at a side of the first base plate distal to the liquid crystal layer.

In an embodiment, the first and second conductive structures are connected to conductive terminals of the ground electrode through conductive wires, respectively, and at least one of a resistivity and an inductance of each of the conductive wires is less than a corresponding one of a resistivity and an inductance of an ITO material.

In an embodiment, the first and second conductive structures are both plate electrodes.

In an embodiment, the plurality of branch structures at a same side of the main body structure have a same shape; and
wherein every adjacent two of the plurality of branch structures at the same side have a same distance therebetween.

In an embodiment, the main body structure and the plurality of branch structures at either of the first and second sides are an integrally formed structure; and
wherein a material of the first substrate includes at least one of glass, ceramic and high-purity quartz glass.

In an embodiment, the liquid crystal layer includes positive liquid crystal molecules, and an angle between a long axis direction of each of the positive liquid crystal molecules and a plane where the first base plate is located is greater than 0 degree and equal to or less than 45 degrees; or
wherein the liquid crystal layer includes negative liquid crystal molecules, and an angle between a long axis direction of each of the negative liquid crystal molecules and a plane where the first base plate is located is greater than 45 degrees and smaller than 90 degrees.

In an embodiment, the main body structure of the first electrode layer includes an impedance matching region, which is triangular or trapezoidal in a plan view, and is configured to make impedances of portions of the first electrode layer match to each other.

In an embodiment, a thickness of a portion of the liquid crystal layer between the first electrode layer and the second electrode layer is in a range of 5 microns to 20 microns.

In an embodiment, the first substrate includes a ground electrode electrically connected to the second electrode layer.

In an embodiment, the second electrode layer further includes a first connection portion directly connected to the plurality of first fingers.

A second aspect of the present disclosure provides a liquid crystal phase shifter, including
a first substrate and a second substrate opposite to each other, and a liquid crystal layer between the first substrate and the second substrate; wherein the first substrate includes a first base plate and a first electrode layer at a side of the first base plate proximal to the liquid crystal layer;

the second substrate includes a second base plate and a second electrode layer at a side of the second base plate proximal to the liquid crystal layer; and the first electrode layer includes a main body structure having a first side and a second side opposite to each other with respect to an extension direction of the main body structure, and a plurality of branch structures connected to only one of the first side and the second side of the main body structure, wherein the second electrode layer is at only one side of the second base plate corresponding to the plurality of branch structures.

In an embodiment, the second electrode layer is a plate electrode.

In an embodiment, the first electrode layer is a microstrip, and a ground electrode is at a side of the first base plate distal to the liquid crystal layer.

In an embodiment, the second electrode layer is connected to a conductive terminal of the ground electrode through a conductive wire, and at least one of a resistivity and an inductance of the conductive wire is less than a corresponding one of a resistivity and an inductance of an ITO material.

A third aspect of the present disclosure provides a liquid crystal antenna, which includes the liquid crystal phase shifter according to any one of the foregoing embodiments of the first and second aspects of the present disclosure.

A fourth aspect of the present disclosure provides a communication apparatus, which includes the liquid crystal antenna according to any one of the foregoing embodiments of the third aspect of the present disclosure.

A fifth aspect of the present disclosure provides a method for operating a liquid crystal phase shifter, wherein the liquid crystal phase shifter is the liquid crystal phase shifter according to any one of the foregoing embodiments of the first and second aspects of the present disclosure, and the method includes applying a first voltage to the first electrode layer; and applying a second voltage different from the first voltage to the second electrode layer to generate an electric field between the first electrode layer and the second electrode layer, such that long axes of liquid crystal molecules of the liquid crystal layer are substantially parallel or substantially perpendicular to a direction of the electric field.

DETAILED DESCRIPTION

Figure 1:
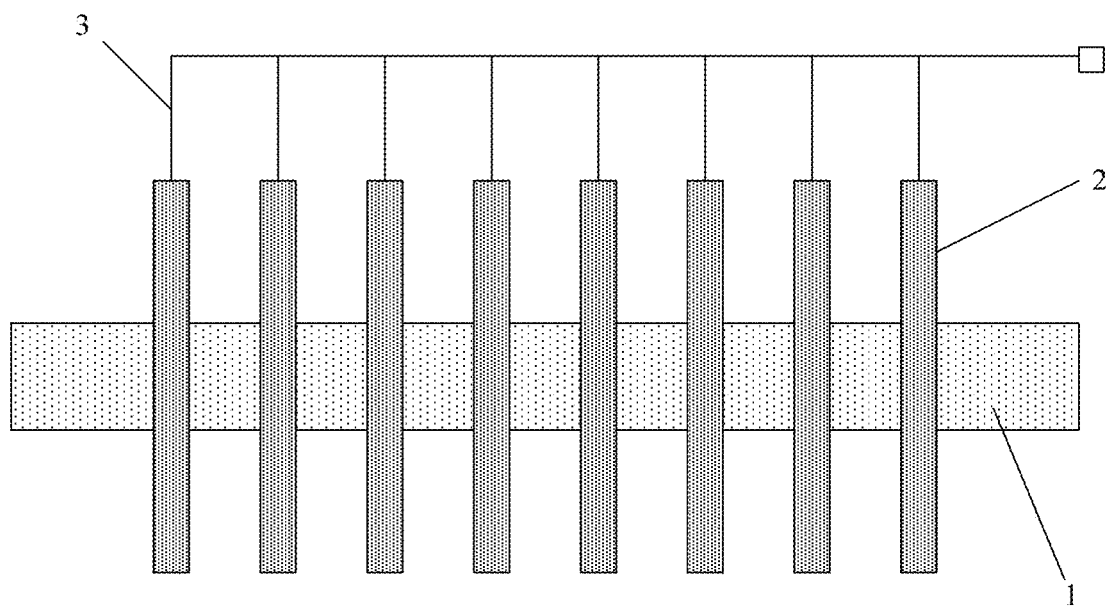
FIG. 1 is a schematic top view of a liquid crystal phase shifter according to an embodiment of the present disclosure.

To enable one of ordinary skill in the art to better understand the technical solutions of the present disclosure, the present disclosure will be further described in detail below with reference to the accompanying drawings and exemplary embodiments.

Unless otherwise defined, technical or scientific terms used in the present disclosure (including embodiments and claims) should have the ordinary meaning as understood by one of ordinary skill in the art to which the present disclosure belongs. The use of "first," "second," and the like in the present disclosure is not intended to indicate any order, quantity, or importance, but rather is used for distinguishing one element from another. The word "comprising," "including", or the like, means that the element or item preceding the word contains the element or item listed after the word and the equivalents thereof, but does not exclude the presence of other elements or items. The terms "connected," "coupled", or the like is not limited to physical or mechanical connections, but may include electrical connections, whether direct or indirect connections. The wording "upper," "lower," "left," "right," and the like are used only for indicating relative positional relationships in the drawings, and when the absolute position of the object being described is changed, these relative positional relationships may also be changed accordingly.

It is to be understood that when an element such as a layer, film, region or substrate is referred to as being "on" or "under" another element, it can be "directly on" or "directly under" the other element or intervening elements may be present.

An embodiment of the present disclosure provides a liquid crystal phase shifter, as shown in FIG. 1. The liquid crystal phase shifter includes first and second substrates disposed opposite to each other, and a liquid crystal layer (not shown in FIG. 1) disposed between the first and second substrates. A Microstrip (which may also be referred to as "microstrip line") 1 is arranged at a side of the first substrate proximal to the liquid crystal layer, and a plurality of metal patches 2 are periodically arranged at a side of the second substrate proximal to the liquid crystal layer. The plurality of metal patches are connected to a ground electrode (which is shown as a rectangular box in the upper right corner of FIG. 1 and may be located at a side of the first substrate distal to the liquid crystal layer) by a plurality of indium tin oxide (ITO) leads 3, respectively. For the liquid crystal phase shifter, it is possible to change the dielectric constant of the liquid crystal layer, by applying a first voltage to the microstrips 1 and applying a second voltage different from the first voltage to the plurality of metal patches 2 to form an electric field between the microstrips 1 and the plurality of metal patches 2 so as to drive liquid crystal molecules in the liquid crystal layer to rotate, thereby changing the value of capacitance formed by the microstrips 1 and the plurality of metal patches 2 due to the microstrips 1 at least partial overlapping the plurality of metal patches 2 in a direction perpendicular to the first substrate or the second substrate. In this way, a phase shift of a microwave signal is achieved (i.e. a phase of the microwave signal is changed).

However, the inventors of the present inventive concept found that, in the liquid crystal phase shifter shown in FIG. 1, since each metal patch 2 is connected to the ground electrode through the corresponding ITO lead 3, and since the inductance and resistance of each ITO lead 3 are relatively large, in a case that the inductance and the resistance of each ITO lead 3 are changed by a certain amount, the certain amount will result in a small change amount of the capacitance formed by the microstrip 1 and the plurality of metal patches 2. Thus, a microwave signal will not be subjected to a sufficiently large change of the capacitance formed by the microstrip 1 and the metal patches 2, and therefore a desired phase shift of the microwave signal may not be achieved.

Accordingly, some embodiments of the present disclosure provide a liquid crystal phase shifter that can effectively shift a phase of a microwave signal.

An embodiment of the present disclosure provides a liquid crystal phase shifter, including: a first substrate and a second substrate disposed opposite to each other, and a liquid crystal layer positioned between the first substrate and the second substrate. The first substrate include a first base plate, and a first electrode layer positioned at a side of the first base plate proximal to the liquid crystal layer. The first electrode layer includes a main body structure having a first side and a second side opposite to each other with respect to an extension direction of the main body structure, and a plurality of branch structures connected to at least one of the first side and the second side of the main body structure. The second substrate includes a second base plate, and a second electrode layer at a side of the second base plate proximal to the liquid crystal layer. The second electrode layer is located in a peripheral region of the second base plate, and an orthographic projection of the second electrode layer on the first base plate partially overlaps an orthographic projection of at least one (e.g., each) of the plurality of branch structures on the first base plate.

In the phase shifter according to the present embodiment, the first electrode layer may not only transmit microwave signals, but also receive a first voltage applied thereto. The second electrode layer may receive a second voltage different from the first voltage applied thereto. As such, an electric field will be formed between the branch structures of the first electrode layer and the second electrode layer to drive the liquid crystal molecules of the liquid crystal layer to rotate, thereby changing a dielectric constant of the liquid crystal layer, and achieving a phase shift of a microwave signal. In the present embodiment, since the second electrode layer is disposed in the peripheral region of the second base plate, a length of each ITO lead for applying the second voltage to the second electrode layer may be shortened, and thus the inductance and resistance of the ITO lead may be reduced, thereby achieving a phase shift of a microwave signal effectively.

Figure 2A:
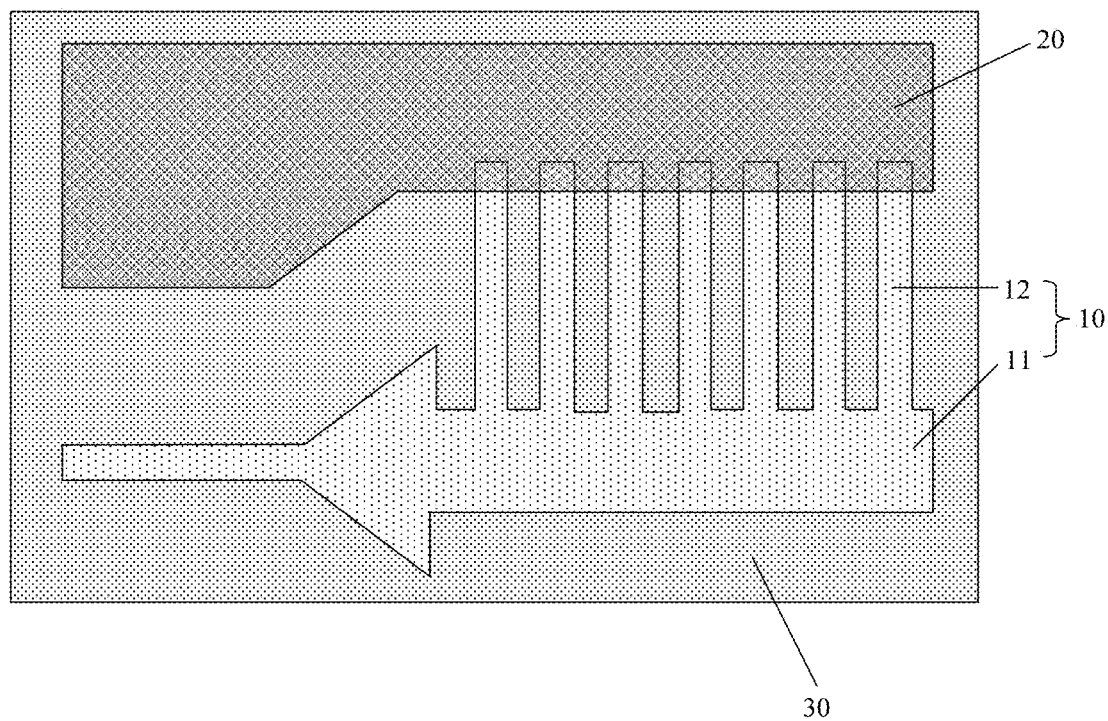
FIG. 2A is a schematic top view of a liquid crystal phase shifter according to an embodiment of the present disclosure.
Figure 2B:
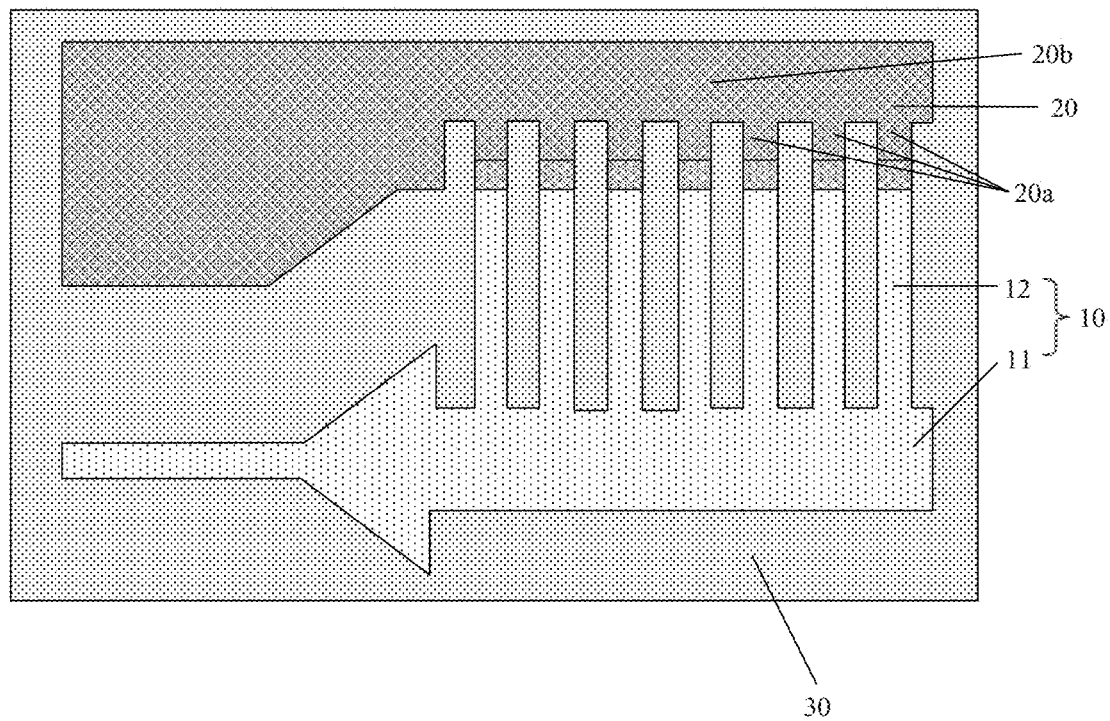
FIG. 2B is a schematic top view of a liquid crystal phase shifter according to an embodiment of the present disclosure.

As shown in FIGS. 2A to 3B (e.g., each of FIGS. 3A and 3B may be a side view of each of FIGS. 2A and 2B viewed from the right side of each of FIGS. 2A and 2B), an embodiment of the present disclosure provides a liquid crystal phase shifter including: a first substrate and a second substrate disposed opposite to each other, and a liquid crystal layer 60 disposed between the first substrate and the second substrate. The first substrate includes a first base plate 40, and a first electrode layer 10 at a side of the first base plate 40 proximal to the liquid crystal layer 60. The first electrode layer 10 includes a main body structure 11 having a first side (e.g., an upper side in FIG. 2A or 2B) and a second side (e.g., a lower side in FIG. 2A or 2B) opposite to each other with respect to an extension direction (e.g., the horizontal direction in FIG. 2A or 2B) of the main body structure 11, and the first electrode layer 10 further includes a plurality of branch structures 12 connected to the first side of the main body structure 11 and arranged periodically. The second substrate includes a second base plate 50 and a second electrode layer 20 at a side of the second base plate 50 proximal to the liquid crystal layer 60. The second electrode layer 20 of the second substrate is located in a peripheral region of the second base plate 50, and located at a position corresponding to the plurality of branch structures 12 on the first base plate 40. For example, the second electrode layer 20 is located in the peripheral region of the second base plate 50, and an outer end (e.g., the right end in FIG. 3A or 3B) of the second electrode layer 20 is flush with the corresponding end (e.g., the right end in FIG. 3A or 3B) of the second base plate 50. An orthographic projection of the second electrode layer 20 on the first base plate 40 partially overlaps an orthographic projection of at least one (e.g., may be each) of the plurality of branch structures 12 on the first base plate 40 (or on the second base plate 50). Alternatively, a plurality of branch structures 12 may also be connected to the second side of the main body structure 11. In the present embodiment, description is made by taking the case that the plurality of branch structures 12 are connected to the first side of the main body structure 11 as an example. In an embodiment, the second electrode layer 20 may be a plate-shaped electrode, as shown in FIG. 2A. In an embodiment, the second electrode layer 20 may be a comb-shaped electrode or an interdigital electrode, as shown in FIG. 2B. For example, the second electrode layer 20 may be a comb-shaped electrode or an interdigital electrode includes a plurality of first fingers 20a in one-to-one correspondence with the plurality of branch structures 12 connected to the first side (e.g., the upper side in FIG. 2B) of the main body structure 11, and an orthographic projection (i.e., an orthogonal projection) of each of the plurality of first fingers 20a of the second electrode layer 20 on the first base plate 40 at least partially (e.g., completely) overlaps an orthographic projection of a corresponding branch structure 12 connected to the first side (e.g., the upper side in FIG. 2B) of the main body structure 11 on the first base plate 40. Further, the second electrode layer 20 may be located in a peripheral region of the second base plate 50, but the present disclosure is not limited thereto, as long as the second electrode layer 20 and the ground electrode 30 are electrically connected to each other (i.e., have a same voltage or a same potential). Further, the orthographic projection of each of the plurality of first fingers 20a of the second electrode layer 20 on the first base plate 40 may not overlap the main body structure 11 of the first electrode layer 10. The second electrode layer 20 may further include a first connection portion 20b directly connected to the plurality of first fingers 20a of the second electrode layer 20, and for example, the first connection portion 20b and the plurality of first fingers 20a have a one-piece structure and include a same material.

For example, the first electrode layer 10 may be a microstrip (i.e., the microstrip includes the main body structure 11 and the branch structures 12, and the main body structure 11 and the branch structures 12 are integrally formed). A ground electrode 30 may be further disposed at a side of the first base plate 40 distal to the microstrip, and orthographic projections of the first electrode layer 10 and the ground electrode 30 on the first base plate 40 at least partially overlap each other. For example, each end of the ground electrode 30 and the corresponding end of the first base plate 40 may be flush with each other. The ground electrode 30 and the microstrip (i.e., the first electrode layer 10) form a microwave transmission structure such that most of microwave signal(s) fed into the microstrip by a feed interface will be transmitted in the first base plate 40 between the ground electrode 30 and the microstrip. In order to reduce the loss of the microwave signal(s), the first base plate 40 may be made of a material such as glass, ceramic, or the like. This material does not substantially absorb the microwave signal(s) and thus the loss of the microwave signal(s) is small. Further, a small part of the microwave signal(s) will be transmitted in the liquid crystal layer 60. When a voltage is applied across the microstrip and the second electrode layer 20, the liquid crystal molecules 61 will be driven to rotate, and the dielectric constant of the liquid crystal layer 60 will be changed, thereby a phase shift of each of the microwave signal(s) transmitted in the liquid crystal layer 60 is realized. The microwave signal in the first base plate 40 and the microwave signal in the liquid crystal layer 60 are then interactively transmitted, thereby achieving an overall phase shift of the microwave signal(s). In other words, a large part of the microwave signal(s) transmitted in the first base plate 40 and a small part of the microwave signal(s) transmitted in the liquid crystal layer 60 may undergo a same phase shift.

Figure 3A:
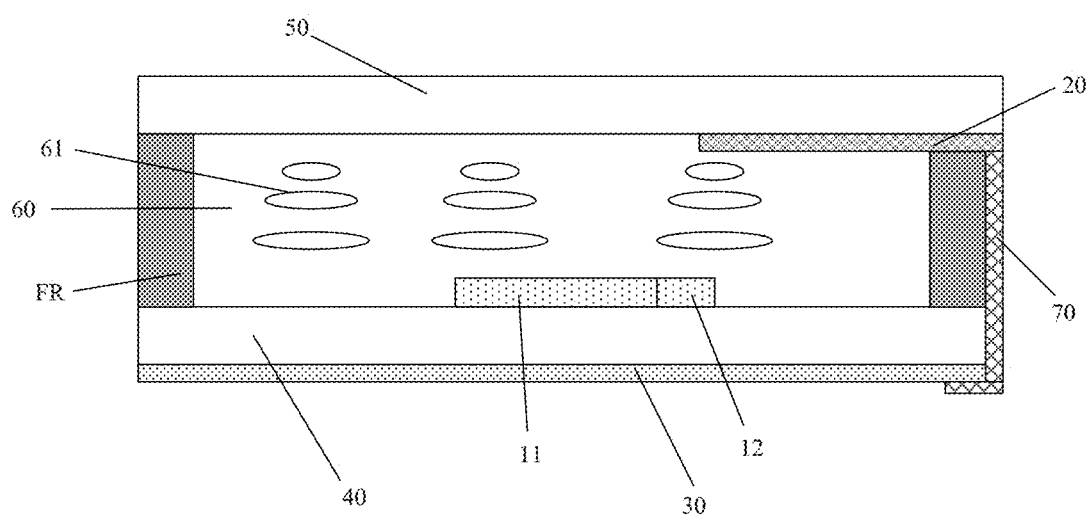
FIG. 3A is a schematic side view of a liquid crystal phase shifter according to an embodiment of the present disclosure.
Figure 3B:
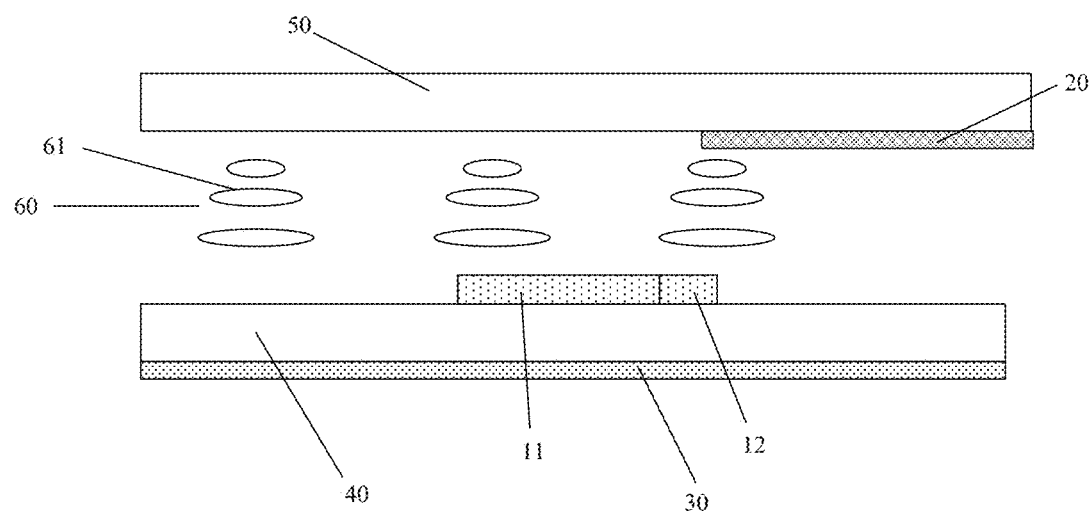
FIG. 3B is a schematic side view of a liquid crystal phase shifter according to an embodiment of the present disclosure.

For example, the second electrode layer 20 may be connected with a corresponding one of conductive terminals of the ground electrode 30 (e.g., both ends of the ground electrode 30) through a conductive wire 70, such that a same voltage may be applied to both the second electrode layer 20 and the ground electrode 30 or both the second electrode layer 20 and the ground electrode 30 may be at (or may have) a same potential, as shown in FIG. 3A. In this case, the ground electrode 30 and the second electrode layer 20 will be provided with a same signal, and this connection facilitates the control of the phase shifter and also simplifies the wiring of the phase shifter. For example, at least one of the resistivity and the inductance of the conductive wire 70 may be less than a respective one of the resistivity and the inductance of the ITO material. For example, a material of the conductive wire 70 may be metal (i.e., the conductive wire 70 may be a metal connection line), and the metal may be copper, but is not limited thereto, and may also be silver, etc. Alternatively, it is also possible to provide a conductive terminal at an edge of the second substrate (e.g., the right edges of the second base plate 50 and the second electrode layer 20 shown in FIG. 3A), so as to separately control the ground electrode 30 and the second electrode layer 20. The length of the conductive wire 70 is significantly less than the length of each of the ITO leads shown in FIG. 1, and the resistivity and inductance of the metal (e.g., copper) are less than those of ITO, respectively. Therefore, a certain amount of change in the resistivity and inductance of the conductive wire 70 may cause a large amount of change in the capacitance formed by the second electrode layer 20 and the first electrode layer 10, thereby easily achieving a desired amount of phase shift of a microwave signal. In an embodiment, the phase shifter may further include a sealing frame FR, which is U-shaped and seals and assembles the base plate 40, the first electrode layer 10, the liquid crystal layer 60, the second electrode layer 20, and the second base plate 50 into a cell, as shown in FIG. 3A. The ground electrode 30 and the conductive wire 70 may be located outside of the sealing frame FR. The sealing frame FR may be made of a resin, a plastic, or the like. Further, the sealing frame FR may have an opening through which the second electrode layer 20 extends to the outside of the the sealing frame FR, so as to be connected to an end of the conductive wire 70. Alternatively, the second electrode layer 20 may not be connected with a corresponding one of conductive terminals of the ground electrode 30 (e.g., both ends of the ground electrode 30), and in this case a same voltage may be applied to both the second electrode layer 20 and the ground electrode 30 through external wires, respectively, such that both the second electrode layer 20 and the ground electrode 30 may be at (or may have) a same potential, as shown in FIG. 3B. That is, the conductive wire 70 is optional.

For example, the sizes of the branch structures 12 of the first electrode layer 10 are the same, and the distances between every adjacent two of the branch structures are the same. Alternatively, the distances between every adjacent two of the branch structures 12 may also be distributed according to a predetermined rule. And a width of a portion of each branch structure 12 overlapping the second electrode layer 20 may be different from a width of the remaining portion of the branch structure 12, so that a size of an overlapping area of the branch structure 12 and the second electrode layer 20 may be adjusted, thereby adjusting a value of the formed capacitance, as shown in FIG. 4C. Such configuration may be set according to the requirements of an actual product.

For example, in the present embodiment, the main body structure 11 and the branch structures 12 of the microstrip may be formed as an integral structure, i.e., the main body structure 11 and the branch structures 12 may be formed in a same layer and made of a same material. As such, both of the main body structure 11 and the branch structures 12 may be formed by one patterning process, thereby increasing the production efficiency thereof.

For example, each of the first base plate 40 and the second base plate 50 may be a glass substrate with a thickness of 100 microns to 1000 microns, or a sapphire substrate, or may be a polyethylene terephthalate substrate, a triallyl cyanurate substrate, or a transparent flexible polyimide substrate, which has a thickness of 10 microns to 500 microns. For example, each of the first base plate 40 and the second base plate 50 may be made of high-purity quartz glass having extremely low dielectric loss. Compared with a general glass substrate, the first base plate 40 and/or the second base plate 50 made of high-purity quartz glass may reduce the loss of microwaves effectively, thereby ensuring the phase shifter to have low power consumption and a high signal-to-noise ratio. For example, the high-purity quartz glass may refer to quartz glass in which the weight percentage of $SiO_2$ is 99.9% or more.

For example, a material of each of the microstrip, the ground electrode 30, and the second electrode layer 20 may include a metal such as aluminum, silver, gold, chromium, molybdenum, nickel, iron, or the like.

For example, the liquid crystal molecules 61 of the liquid crystal layer 60 may be positive liquid crystal molecules 61 or negative liquid crystal molecules 61. It should be noted that, in a case where the liquid crystal molecules 61 are positive liquid crystal molecules 61, an angle between a long axis direction of each liquid crystal molecule 61 and a plane where the first base plate 40 (or the second base plate 50) is located is greater than 0 degree and is equal to or less than 45 degrees. In a case where the liquid crystal molecules 61 are negative liquid crystal molecules 61, an angle between the long axis direction of each liquid crystal molecule 61 and the plane where the first base plate 40 (or the second base plate 50) is located is greater than 45 degrees and smaller than 90 degrees. As such, it is guaranteed that the dielectric constant of the liquid crystal layer 60 is changed after the liquid crystal molecules 61 are driven to rotate, thereby achieving the purpose of phase shifting.

The microstrip of the phase shifter according to the present embodiment may not only transmit microwave signals, but also receive a first voltage applied to the microstrip, and the second electrode layer 20 may receive a second voltage, which is different from the first voltage, applied to the second electrode layer 20. As such, an electric field may be formed between the plurality of branch structures 12 of the microstrip and the second electrode layer 20 to drive the liquid crystal molecules 61 of the liquid crystal layer 60 to rotate, thereby changing the dielectric constant of the liquid crystal layer 60, and achieving a phase shift of a microwave signal. Further, in the present embodiment, since the second electrode layer 20 is disposed in the peripheral region of the second base plate 50, the length of the conductive wire 70 for applying the second voltage to the second electrode layer 20 may be shortened, and the inductance and the resistance of the conductive wire 70 may be further reduced. In this way, a more effective phase shift may be performed on the microwave signal.

Figure 4A:
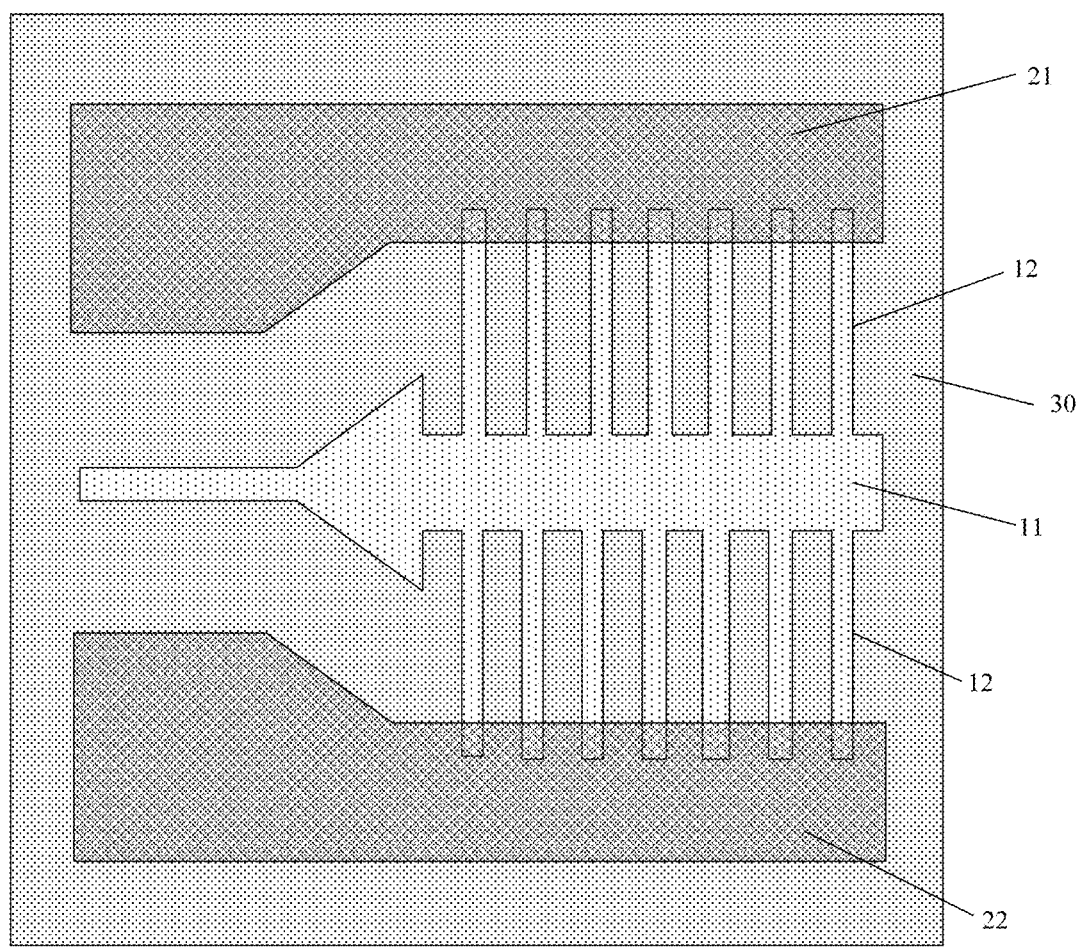
FIGS. 4A to 4D are schematic top views of liquid crystal phase shifters according to some embodiments of the present disclosure.
Figure 4B:
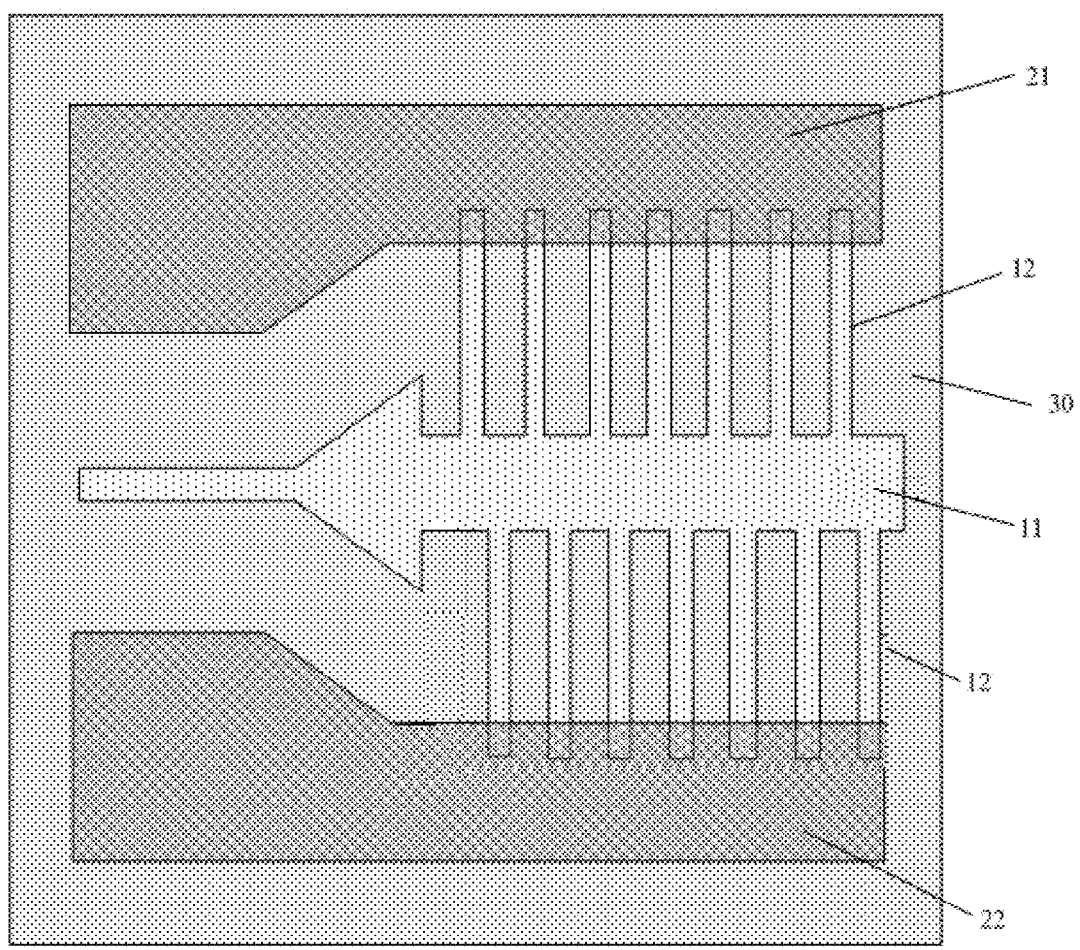
Figure 4C:
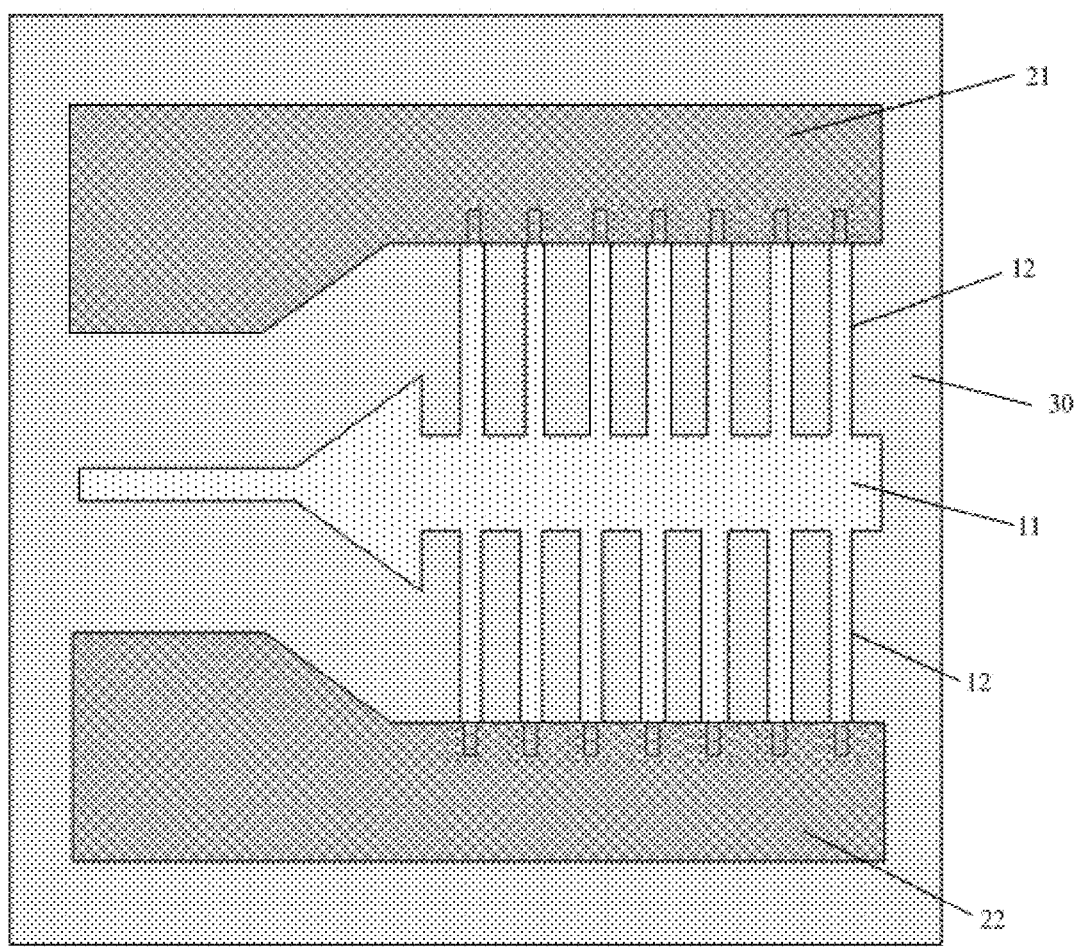
Figure 4D:
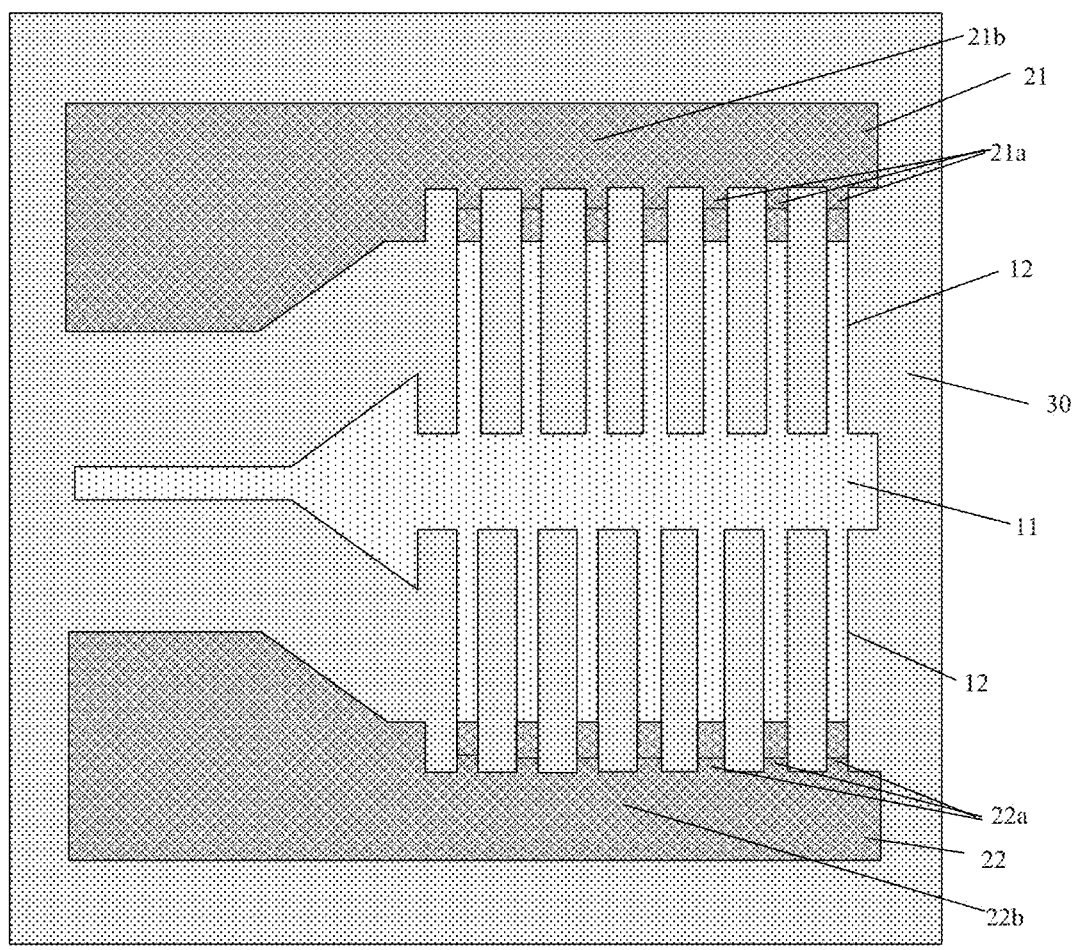
Figure 4E:
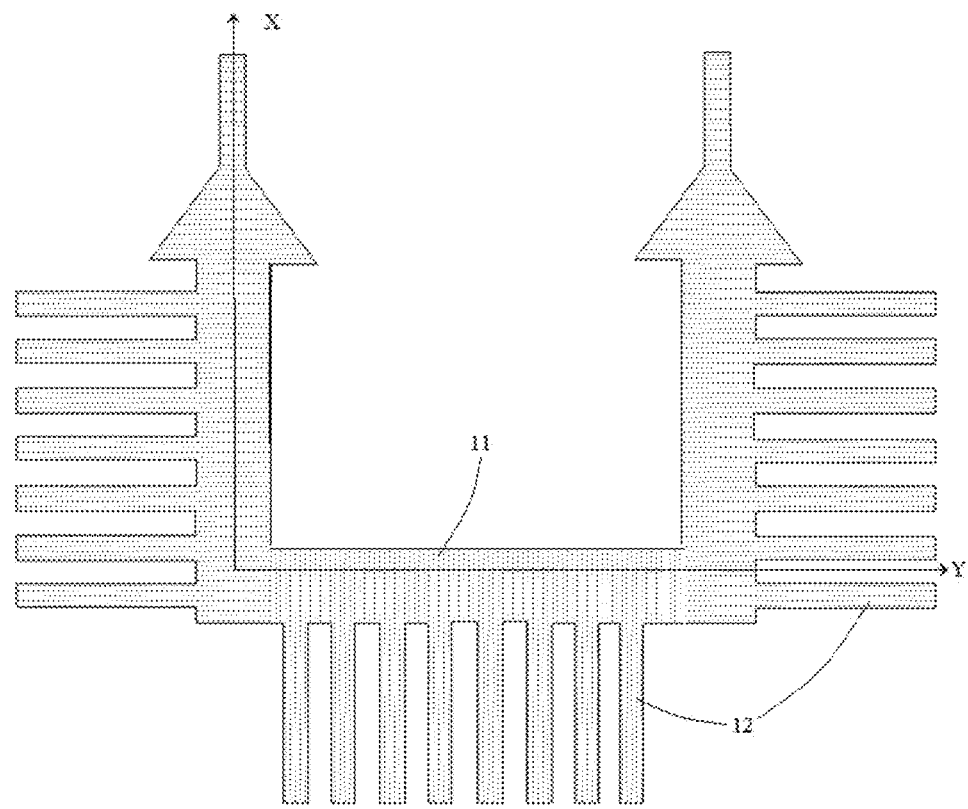
FIG. 4E is a schematic top view of a first electrode layer according to some embodiments of the present disclosure.
Figure 5:
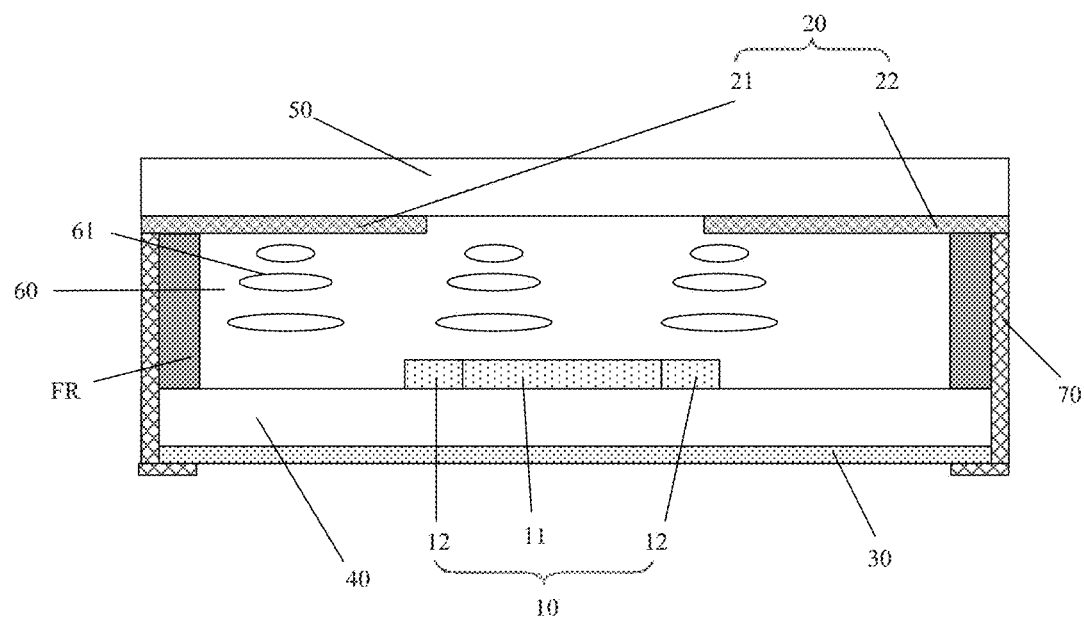
FIG. 5 is a schematic side view of a liquid crystal phase shifter according to an embodiment of the present disclosure.

As shown in FIGS. 4A to 5 (e.g., FIG. 5 may be a side view of FIG. 4A viewed from the right side of FIG. 4A), the present embodiment provides another liquid crystal phase shifter, including: a first substrate and a second substrate disposed opposite to each other, and a liquid crystal layer 60 between the first substrate and the second substrate. The first substrate include a first base plate 40, and a first electrode layer 10 at a side of the first base plate 40 proximal to the liquid crystal layer 60. The first electrode layer 10 includes a main body structure 11 having a first side (e.g., an upper side in FIG. 4A) and a second side (e.g., a lower side in FIG. 4A) opposite to each other with respect to an extension direction (e.g., the horizontal direction in FIG. 4A) of the main body structure 11, and the first electrode layer 10 further includes a plurality of branch structures 12 connected to each of the first side and the second side of the main body structure 11. The plurality of branch structures 12 connected to the first side and the plurality of branch structures 12 connected to the second side may be symmetric (as shown in FIG. 4A) or asymmetric (as shown in FIG. 4B) about the main body structure 11. The second electrode layer 20 includes a first conductive structure 21 and a second conductive structure 22 located in peripheral regions of the second base plate 50, respectively (e.g., a left end of the first conductive structure 21 and a left end of the second base plate 50 may be flush with each other, and a right end of the second conductive structure 22 and a right end of the second base plate 50 may be flush with each other, as shown in FIG. 5). Further, an orthographic projection of the first conductive structure 21 on the first base plate 40 partially overlaps an orthographic projection of at least one (e.g., may be each) of the plurality of branch structures 12 connected to the first side (e.g., the upper side in FIG. 4A) of the main body structure 11 on the first base plate 40, and an orthographic projection of the second conductive structure 22 on the first base plate 40 overlaps an orthographic projection of at least one (e.g., may be each) of the plurality of branch structures 12 connected to the second side (e.g., the lower side in FIG. 4A) of the main body structure 11 on the first base plate 40.

In an embodiment, each of the first conductive structure 21 and the second conductive structure 22 may be a plate-shaped electrode, as shown in FIGS. 4A to 4C. In an embodiment, each of the first conductive structure 21 and the second conductive structure 22 may be a comb-shaped electrode or an interdigital electrode, as shown in FIG. 4D.

For example, the first conductive structure 21 may be a comb-shaped electrode or an interdigital electrode including a plurality of second fingers 21a in one-to-one correspondence with the plurality of branch structures 12 connected to the first side (e.g., the upper side in FIG. 4D) of the main body structure 11, and an orthographic projection (i.e., an orthogonal projection) of each of the plurality of second fingers 21a of the first conductive structure 21 on the first base plate 40 at least partially (e.g., completely) overlaps an orthographic projection of a corresponding branch structure 12 connected to the first side (e.g., the upper side in FIG. 4D) of the main body structure 11 on the first base plate 40. Further, the orthographic projection of each of the plurality of second fingers 21a of the first conductive structure 21 on the first base plate 40 may not overlap the main body structure 11 of the first electrode layer 10. The first conductive structure 21 may further include a second connection portion 21b directly connected to the plurality of second fingers 21a of the first conductive structure 21, and for example, the second connection portion 21b and the plurality of second fingers 21a have a one-piece structure and include a same material, as shown in FIG. 4D. Similarly, the second conductive structure 22 may be a comb-shaped electrode or an interdigital electrode including a plurality of third fingers 22a in one-to-one correspondence with the plurality of branch structures 12 connected to the second side (e.g., the lower side in FIG. 4D) of the main body structure 11, and an orthographic projection of each of the plurality of third fingers 22a of the second conductive structure 22 on the first base plate 40 at least partially (e.g., completely) overlaps an orthographic projection of a corresponding branch structure 12 connected to the second side (e.g., the lower side in FIG. 4D) of the main body structure 11 on the first base plate 40. Further, the orthographic projection of each of the plurality of third fingers 22a of the second conductive structure 22 on the first base plate 40 may not overlap the main body structure 11 of the first electrode layer 10. The second conductive structure 22 may further include a third connection portion 22b directly connected to the plurality of third fingers 22a of the second conductive structure 22, and for example, the third connection portion 22b and the plurality of third fingers 22a have a one-piece structure and include a same material, as shown in FIG. 4D.

Further, the plurality of branch structures 12 connected to the first side of the main body structure 11 may have a same width (i.e., a size in the extension direction (i.e., lengthwise direction) of the main body structure 11), and the plurality of branch structures 12 connected to the second side of the main body structure 11 may have a same width (i.e., a size in the extension direction (i.e., lengthwise direction) of the main body structure 11), as shown in FIGS. 4A to 4C. Alternatively, the plurality of branch structures 12 connected to the first side of the main body structure 11 may have different widths, and the plurality of branch structures 12 connected to the second side of the main body structure 11 may have different widths, as shown in FIG. 4D.

In some embodiments, the extension direction of the main body structure 11 may be constant (i.e., unchanged), thereby reducing the difficulty of a manufacturing method for the phase shifter, as shown in FIGS. 2A to 4D. Alternatively, the extension direction of the main body structure 11 may be changed, for example, from a first direction X to a second direction Y, and then changed from the second direction Y to the first direction X, thereby reducing the space by which the phase shifter occupies, as shown in FIG. 4E. In this case, the first direction X and the second direction Y are not parallel to each other, but form an acute angle or a blunt angle therebetween. Further, the second electrode layer 20 may have a shape matching a shape of the main body structure 11. Further, in an embodiment, one of the first side and the second side of the main body structure 11 has the plurality of branch structures 12 connected thereto. Alternatively, each of the first side and the second side of the main body structure 11 has the plurality of branch structures 12 connected thereto.

For example, the first electrode layer 10 may be a microstrip (i.e., the microstrip includes the main body structure 11 and the plurality of branch structures 12 connected to each of the first side and the second side of the main body structure 11, and the main body structure 11 and all of the branch structures 12 are an integrally formed structure), a ground electrode 30 may be further disposed at a side of the first base plate 40 distal to the microstrip, and orthographic projections of the microstrip (i.e., the first electrode layer 10) and the ground electrode 30 on the first base plate 40 at least partially overlap each other. For example, each end of the ground electrode 30 may be flush with a corresponding end of the first base plate 40. The ground electrode 30 and the microstrip form a microwave transmission structure such that most of the microwave signal(s) fed into the microstrip by a feed interface will be transmitted in the first base plate 40 between the ground electrode 30 and the microstrip. As described above, in order to reduce the loss of the microwave signal(s), the first base plate 40 may be made of glass, ceramic, or the like. As such, the first base plate 40 does not substantially absorb the microwave signal(s), so that the loss of the microwave signal is small. Further, a small part of the microwave signal(s) will be transmitted in the liquid crystal layer 60. When a first voltage is applied to the microstrip, and a second voltage different from the first voltage is applied to the first conductive structure 21 and the second conductive structure 22, the liquid crystal molecules 61 of the liquid crystal layer 60 will be driven to rotate, and the dielectric constant of the liquid crystal layer 60 will be changed, thereby achieving phase shifting of the microwave signal(s) transmitted in the liquid crystal layer 60. Then, the microwave signal(s) in the first base plate 40 and the microwave signal(s) in in the liquid crystal layer 60 are transmitted interactively, thereby achieving a phase shift of the microwave signal(s) as a whole. As described above, the left end of the first conductive structure 21 and the left end of the second base plate 50 may be flush with each other, the right end of the second conductive structure 22 and the right end of the second base plate 50 may be flush with each other, and each end of the ground electrode 30 and the corresponding end of the first base plate 40 may be flush with each other. As such, each conductive wire 70 may be located only at the outside of the phase shifter without extending into the inside of the phase shifter, as shown in FIGS. 3A and 5, thereby effectively reducing the length, resistance, and inductance of each conductive wire 70. Therefore, a desired amount of phase shift is easily achieved.

For example, the first and second conductive structures 21 and 22 may be connected with conductive terminals of the ground electrode 30 (e.g., both ends of the ground electrode 30) through conductive wires 70, respectively. In this case, the signals applied to the ground electrode 30, the first conductive structure 21 and the second conductive structure 22 are the same, which facilitates the control of the phase shifter. As described above, a material of the conductive wire 70 may be metal, such as copper, but is not limited thereto, and may be silver, etc. Alternatively, it is also possible to provide conductive terminals at the edges of the second substrate (e.g., the left edges of the second base plate 50 and the first conductive structure 21 and the right edges of the second base plate 50 and the second conductive structure 22, as shown in FIG. 5) to separately control the ground electrode 30, the first conductive structure 21, and the second conductive structure 22.

For example, the sizes of the branch structures 12 of the first electrode layer 10 are the same, and the distances between every adjacent two of the branch structures connected to each of the first and second sides of the main body structure 11 are the same. Alternatively, the distances between every adjacent two of the branch structures connected to each of the first and second sides of the main body structure 11 may also be set according to a predetermined rule. Moreover, a width of a portion of each branch structure 12 overlapping the first conductive structure 21 or the second conductive structure 22 of the second electrode layer 20 may be different from a width of the remaining portion of the branch structure 12, as shown in FIG. 4C, so as to adjust a value of the capacitance formed between the branch structure 12 and the second electrode layer 20. Such configuration may be set according to the requirements of an actual product.

For example, in the present embodiment, the main body structure 11 and all of the branch structures 12 of the first electrode layer 10 may be formed as an integral structure (i.e., one-piece structure), i.e., the main body structure 11 and all of the branch structures 12 are formed in a same layer and made of a same material. In this way, both the main body structure 11 and all of the branch structures 12 may be formed in one patterning process, thereby increasing the production efficiency thereof.

For example, each of the first base plate 40 and the second base plate 50 may be a glass substrate with a thickness of 100 microns to 1000 microns, or a sapphire substrate, or may be a polyethylene terephthalate substrate, a triallyl cyanurate substrate, or a transparent flexible polyimide substrate, which has a thickness of 10 microns to 500 microns. For example, each of the first base plate 40 and the second base plate 50 may be made of high-purity quartz glass having extremely low dielectric loss. Compared with a general glass substrate, the first base plate 40 and/or the second base plate 50 made of high-purity quartz glass may reduce the loss of microwaves effectively, thereby ensuring the phase shifter to have low power consumption and a high signal-to-noise ratio. For example, the high-purity quartz glass may refer to quartz glass in which the weight percentage of $SiO_2$ is 99.9% or more.

For example, a material of each of the microstrip, the ground electrode 30, the first conductive structure 21, and the second conductive structure 22 may be a metal such as aluminum, silver, gold, chromium, molybdenum, nickel, iron, or the like.

For example, the liquid crystal molecules 61 of the liquid crystal layer 60 may be positive liquid crystal molecules 61 or negative liquid crystal molecules 61. It should be noted that, in a case where the liquid crystal molecules 61 are positive liquid crystal molecules 61, an angle between a long axis direction of each liquid crystal molecule 61 and a plane where the first base plate 40 (or the second base plate 50) is located is greater than 0 degree and is equal to or less than 45 degrees. In a case where the liquid crystal molecules 61 are negative liquid crystal molecules 61, an angle between the long axis direction of each liquid crystal molecule 61 and the plane where the first base plate 40 (or the second base plate 50) is located is greater than 45 degrees and smaller than 90 degrees. As such, it is guaranteed that the dielectric constant of the liquid crystal layer 60 is changed after the liquid crystal molecules 61 are driven to rotate, thereby achieving the purpose of phase shifting.

The microstrip of the phase shifter according to the present embodiment may not only transmit microwave signals but also receive a first voltage applied to the microstrip, and the first conductive structure 21 and the second conductive structure 22 may receive a second voltage, which is different from the first voltage, applied to the first conductive structure 21 and the second conductive structure 22. As such, an electric field is formed between the plurality of branch structures 12 connected to the first side of the main body structure 11 of the microstrip and the first conductive structure 21, and between the plurality of branch structures 12 connected to the second side of the main body structure 11 of the microstrip and the second conductive structure 22, to drive the liquid crystal molecules 61 in respective portions of the liquid crystal layer 60 to rotate, thereby changing the dielectric constant of the liquid crystal layer 60, and achieving phase shifting of microwave signals. In the present embodiment, since the second electrode layer 20 is disposed in the peripheral region of the second base plate 50, the length of the conductive wire 70 for applying the second voltage to the second electrode layer 20 may be shortened, and the inductance and the resistance of the conductive wire 70 may be reduced more effectively, thereby performing a more effective phase shift on a microwave signal.

In any one of the embodiments shown in FIGS. 2A to 5, the main body structure 11 of the first electrode layer 10 may further include an impedance matching region (e.g., a region where an arrow pointing towards the left in FIG. 2A or 4A is located). The impedance matching region may be a triangle (including any type of triangle), a trapezoid, or another shape in a plan view, configured to make impedances of respective portions (e.g., a left portion and a right portion of the arrow) of the first electrode layer 10 to match to each other (e.g., be equal to each other), so as to reduce energy loss of a microwave signal, thereby efficiently transmitting the microwave signal. For example, the shape of the impedance matching region in a plan view may depend on factors such as a frequency of an input microwave signal, shapes and sizes of the main body structure 11 and the branch structures 12 of the first electrode 10, a shape and a size of a conductor on the left side of the impedance matching region of FIGS. 2A and 4A, and the like, and may be designed according to a practical application.

In any one of the embodiments shown in FIGS. 2A to 5, a thickness of a liquid crystal cell (e.g., a size of a portion of the liquid crystal layer 60 between the first electrode layer 10 and the second electrode layer 20 in the vertical direction, as shown in FIG. 5) may be between about 5 microns and about 20 microns, such as between about 5 microns and about 10 microns, such as about 5 microns. The thickness of the liquid crystal cell is small so that the liquid crystal molecules 61 of the liquid crystal layer 60 can rapidly rotate in response to the presence of an electric field. As such, the liquid crystal cell has a fast response speed.

It should be understood that although the second electrode layer 20 in FIG. 2A and each of the first and second conductive structures 21 and 22 in FIG. 4A are illustrated as non-rectangular, this is merely exemplary. For example, each of the second electrode layer 20 in FIG. 2A and the first and second conductive structures 21 and 22 in FIG. 4A may be rectangular or irregular in shape, as long as the size of an overlapping area of each branch structure 12 and each of the second electrode layer 20 in FIG. 2A and the first and second conductive structures 21 and 22 in FIG. 4A is adjusted to form a desired value of capacitance.

The present embodiment further provides a liquid crystal antenna including the liquid crystal phase shifter according to any one of the embodiments corresponding to FIGS. 2A to 5. As described above, the phase shifting effect of the liquid crystal phase shifter is excellent. Therefore, the liquid crystal antenna has high efficiency or low power consumption.

For example, at least two patch units may be further disposed at a side of the second base plate 50 distal to the liquid crystal layer 60, and for example, a gap between any adjacent two of the patch units is set corresponding to a gap between any adjacent two of the branch structures 12 (e.g., an orthographic projection of the gap between any adjacent two of the patch units on the first base plate 40 or the second base plate 50 overlaps an orthographic projection of the gap between any adjacent two of the branch structures 12 on the first base plate 40 or the second base plate 50). In this way, the microwave signals phase-adjusted by the phase shifter according to any one of the embodiments of FIGS. 2A to 5 may be radiated outwards through the gap between any adjacent two of the patch units. Alternatively, the feed interface may also be included in the liquid crystal antenna for feeding a microwave signal from a cable to the microwave transmission structure (e.g., the microstrip).

An embodiment of the present disclosure provides a communication apparatus including the liquid crystal antenna according to the above-described embodiment of the present disclosure.

An embodiment of the present disclosure provides a method for operating a liquid crystal phase shifter, which may be the liquid crystal phase shifter according to any one of the embodiments corresponding to FIGS. 2A to 5, and the method may include; applying a first voltage to the first electrode layer 10; and applying a second voltage different from the first voltage to the second electrode layer 20 to generate an electric field between the first electrode layer 10 and the second electrode layer 20, such that the long axes of the liquid crystal molecules 61 of the liquid crystal layer 60 are substantially parallel (for positive liquid crystal molecules) or substantially perpendicular (for negative liquid crystal molecules) to the direction of the electric field.

The embodiments described above may be combined with each other in a case where there is no explicit conflict.

It should be understood that the above embodiments are merely exemplary embodiments for explaining the principle of the present disclosure, and the present disclosure is not limited thereto. It will be apparent to one of ordinary skill in the art that various changes and modifications may be made therein without departing from the spirit and essence of the present disclosure, and these changes and modifications also fall within the scope of the present disclosure.

What is claimed is:

1. A liquid crystal phase shifter, comprising
a first substrate and a second substrate opposite to each other, and a liquid crystal layer between the first substrate and the second substrate; wherein
the first substrate comprises a first base plate and a first electrode layer at a side of the first base plate proximal to the liquid crystal layer;
the second substrate comprises a second base plate and a second electrode layer at a side of the second base plate proximal to the liquid crystal layer; and
the first electrode layer comprises a main body structure having a first side and a second side opposite to each other with respect to an extension direction of the main body structure, and a plurality of branch structures connected to at least one of the first side and the second side of the main body structure,
wherein the second electrode layer comprises a plurality of first fingers in one-to-one correspondence with the plurality of branch structures, and an orthographic projection of each first finger on the first base plate at least partially overlaps an orthographic projection of a corresponding branch structure on the first base plate but does not overlap the main body structure;
wherein the liquid crystal phase shifter further comprises a ground electrode electrically connected to the second electrode layer, and is configured to shift a phase of a microwave signal; and
the ground electrode is at a side of the first base plate distal to the first electrode layer, orthographic projections of the first electrode layer and the ground electrode on the first base plate at least partially overlap each other, and the ground electrode and the first electrode layer form a microwave transmission structure.

2. The liquid crystal phase shifter according to claim 1, wherein each of the first side and the second side of the main body structure is connected with the plurality of branch structures.

3. The liquid crystal phase shifter according to claim 2, wherein the plurality of branch structures connected to the first side and the plurality of branch structures connected to the second side are symmetric about the main body structure.

4. The liquid crystal phase shifter according to claim 3, wherein the second electrode layer comprises a first conductive structure and a second conductive structure;
an orthographic projection of the first conductive structure on the first base plate partially overlaps an orthographic projection of at least one of the plurality of branch structures connected to the first side of the main body structure on the first base plate; and
an orthographic projection of the second conductive structure on the first base plate partially overlaps an orthographic projection of at least one of the plurality of branch structures connected to the second side of the main body structure on the first base plate.

5. The liquid crystal phase shifter according to claim 4, wherein the first electrode layer is a microstrip, and the ground electrode is at a side of the first base plate distal to the liquid crystal layer.

6. The liquid crystal phase shifter according to claim 5, wherein the first and second conductive structures are connected to conductive terminals of the ground electrode through conductive wires, respectively, and at least one of a resistivity and an inductance of each of the conductive wires is less than a corresponding one of a resistivity and an inductance of an ITO material.

7. The liquid crystal phase shifter according to claim 4, wherein the first and second conductive structures are both plate electrodes.

8. The liquid crystal phase shifter according to claim 1, wherein the plurality of branch structures at a same side of the main body structure have a same shape; and
wherein every adjacent two of the plurality of branch structures at the same side have a same distance therebetween.

9. The liquid crystal phase shifter according to claim 1, wherein the main body structure and the plurality of branch structures at either of the first and second sides are an integrally formed structure;
wherein a material of each of the first electrode layer and the second electrode layer is an opaque metal; and
wherein a material of the first substrate comprises at least one of glass, ceramic and high-purity quartz glass.

10. The liquid crystal phase shifter according to claim 1, wherein the liquid crystal layer comprises positive liquid crystal molecules, and an angle between a long axis direction of each of the positive liquid crystal molecules and a plane where the first base plate is located is greater than 0 degree and equal to or less than 45 degrees; or
wherein the liquid crystal layer comprises negative liquid crystal molecules, and an angle between a long axis direction of each of the negative liquid crystal molecules and a plane where the first base plate is located is greater than 45 degrees and smaller than 90 degrees.

11. The liquid crystal phase shifter according to claim 1, wherein the main body structure of the first electrode layer comprises an impedance matching region, which is triangular or trapezoidal in a plan view, and is configured to make impedances of portions of the first electrode layer match to each other.

12. The liquid crystal phase shifter according to claim 1, wherein a thickness of a portion of the liquid crystal layer between the first electrode layer and the second electrode layer is in a range of 5 microns to 20 microns.

13. The liquid crystal phase shifter according to claim 1, wherein the second electrode layer further comprises a first connection portion directly connected to the plurality of first fingers.

14. A liquid crystal phase shifter, comprising
a first substrate and a second substrate opposite to each other, and a liquid crystal layer between the first substrate and the second substrate; wherein
the first substrate comprises a first base plate and a first electrode layer at a side of the first base plate proximal to the liquid crystal layer;
the second substrate comprises a second base plate and a second electrode layer at a side of the second base plate proximal to the liquid crystal layer; and
the first electrode layer comprises a main body structure having a first side and a second side opposite to each other with respect to an extension direction of the main body structure, and a plurality of branch structures connected to only one of the first side and the second side of the main body structure,
wherein the second electrode layer is at only one side of the second base plate corresponding to the plurality of branch structures;
wherein the liquid crystal phase shifter further comprises a ground electrode electrically connected to the second electrode layer, and is configured to shift a phase of a microwave signal; and
the ground electrode is at a side of the first base plate distal to the first electrode layer, orthographic projections of the first electrode layer and the ground electrode on the first base plate at least partially overlap each other, and the ground electrode and the first electrode layer form a microwave transmission structure.

15. The liquid crystal phase shifter according to claim 14, wherein the second electrode layer is a plate electrode; and
wherein a material of each of the first electrode layer and the second electrode layer is an opaque metal.

16. The liquid crystal phase shifter according to claim 14, wherein the first electrode layer is a microstrip, and the ground electrode is at a side of the first base plate distal to the liquid crystal layer.

17. The liquid crystal phase shifter according to claim 16, wherein the second electrode layer is connected to a conductive terminal of the ground electrode through a conductive wire, and at least one of a resistivity and an inductance of the conductive wire is less than a corresponding one of a resistivity and an inductance of an ITO material.

18. A liquid crystal antenna, comprising the liquid crystal phase shifter according to claim 1.

19. A method for operating a liquid crystal phase shifter, wherein the liquid crystal phase shifter is the liquid crystal phase shifter according to claim 1, and the method comprises applying a first voltage to the first electrode layer; and applying a second voltage different from the first voltage to the second electrode layer to generate an electric field between the first electrode layer and the second electrode layer, such that long axes of liquid crystal molecules of the liquid crystal layer are substantially parallel or substantially perpendicular to a direction of the electric field.

20. A liquid crystal antenna, comprising the liquid crystal phase shifter according to claim 14.

* * * * *